United States Patent
Lavi et al.

(10) Patent No.: US 12,140,683 B2
(45) Date of Patent: Nov. 12, 2024

(54) SYSTEM AND METHOD FOR COMBINED RANGING AND GNSS POSITIONING

(71) Applicant: Tupaia Ltd., Ramat-Hasharon (IL)

(72) Inventors: Nadav Lavi, Ramat-Hasharon (IL); Kobi Scheim, Pardess-Hanna (IL)

(73) Assignee: Tupaia Ltd.

( * ) Notice: Subject to any disclaimer, the term of this patent is extended or adjusted under 35 U.S.C. 154(b) by 173 days.

(21) Appl. No.: 16/952,954

(22) Filed: Nov. 19, 2020

(65) Prior Publication Data
US 2021/0157017 A1    May 27, 2021

Related U.S. Application Data

(60) Provisional application No. 62/939,701, filed on Nov. 25, 2019.

(51) Int. Cl.
*G01S 19/46* (2010.01)

(52) U.S. Cl.
CPC .................. *G01S 19/46* (2013.01)

(58) Field of Classification Search
CPC ........... G01S 19/46; G01S 5/14; G01S 5/0236
See application file for complete search history.

(56) References Cited

U.S. PATENT DOCUMENTS

| | | | | |
|---|---|---|---|---|
| 6,701,153 B1* | 3/2004 | Chang | ................... | H04W 64/00 455/456.2 |
| 9,197,297 B2* | 11/2015 | Agee | ................. | H04W 72/0453 |
| 10,578,743 B1* | 3/2020 | Kalathil | ................. | G01S 19/48 |
| 10,813,072 B1* | 10/2020 | Reyes | ................. | H04W 4/029 |
| 10,986,600 B1* | 4/2021 | Chu | ......................... | G01S 5/021 |
| 2002/0033767 A1* | 3/2002 | Krasner | ................... | G01S 19/09 342/357.62 |
| 2004/0041728 A1* | 3/2004 | Bromley | ................. | G01S 19/29 342/357.64 |
| 2006/0166671 A1* | 7/2006 | Rajkotia | ............... | H04W 36/32 370/235 |
| 2008/0186135 A1* | 8/2008 | Boling | ............... | H04B 7/18523 340/7.51 |
| 2010/0093377 A1* | 4/2010 | Riley | .................... | G01S 5/0226 455/456.6 |
| 2010/0117898 A1* | 5/2010 | Wigren | ...................... | G01S 5/14 342/357.43 |
| 2011/0142099 A1* | 6/2011 | Poncelet born Morey | .................... | G05D 1/0225 375/147 |
| 2012/0235812 A1* | 9/2012 | Maia | ....................... | G01S 13/08 340/539.11 |
| 2013/0023282 A1* | 1/2013 | Lin | ......................... | G01S 5/021 455/456.1 |

(Continued)

FOREIGN PATENT DOCUMENTS

WO    WO-2020139497 A1 *    7/2020    ............. G01S 11/08

*Primary Examiner* — Bernarr E Gregory
*Assistant Examiner* — Hailey R Le
(74) *Attorney, Agent, or Firm* — M&B IP ANAYLSTS, LLC (57) ABSTRACT

A system and method for positioning based on navigation systems. The method includes receiving a list of Street Level Stations (SLSs), conducting ranging measurements with each SLS identified within the received list, receiving a global position of the each SLS identified within the received list, and computing a position of a user device based on the ranging measurements and a position of the each SLS identified within the received list.

24 Claims, 7 Drawing Sheets

(56) References Cited

U.S. PATENT DOCUMENTS

| | | | |
|---|---|---|---|
| 2014/0233624 A1* | 8/2014 | Pon | H04W 24/00 |
| | | | 375/226 |
| 2015/0038180 A1* | 2/2015 | Quick, Jr. | H04W 72/048 |
| | | | 455/458 |
| 2015/0223185 A1* | 8/2015 | Harris | H04W 52/0206 |
| | | | 455/456.5 |
| 2017/0214744 A1* | 7/2017 | Neves | H04L 67/34 |
| 2018/0032088 A1* | 2/2018 | van Cruyningen | G06V 20/13 |
| 2018/0259338 A1* | 9/2018 | Stokes | G06T 7/70 |
| 2019/0053191 A1* | 2/2019 | Balappanavar | H04W 4/44 |
| 2019/0172008 A1* | 6/2019 | Hage | G01R 33/0206 |
| 2020/0408927 A1* | 12/2020 | Youssef | H04B 17/318 |
| 2021/0325504 A1* | 10/2021 | Palatov | G01S 5/0284 |
| 2021/0396889 A1* | 12/2021 | Yoshino | G01S 19/22 |
| 2022/0246024 A1* | 8/2022 | Kumar | G08B 25/00 |
| 2022/0346000 A1* | 10/2022 | Baek | H04L 5/0048 |
| 2022/0373639 A1* | 11/2022 | Shaw | G01P 13/00 |

* cited by examiner

SYSTEM AND METHOD FOR COMBINED RANGING AND GNSS POSITIONING

CROSS-REFERENCE TO RELATED APPLICATIONS

This application claims the benefit of U.S. Provisional Application No. 62/939,701 filed on Nov. 25, 2019 the contents of which are hereby incorporated by reference.

TECHNICAL FIELD

The present disclosure relates generally to positioning based on the combination of navigation systems and other additional types of ranging technologies.

BACKGROUND

Global navigation by satellite systems (GNSS) have become an important element of modern life, with applications in numerous domains: transportation, sport, navigation, asset monitoring and more. GNSS includes several satellites constellations operated by the US (GPS/NAVSTAR), Russia (Glonass), EU (Galileo), China (Beidou) and Japan (QZSS), where the last system is relatively local and provides coverage for Asia-Oceania region.

GNSS are often used in positioning and navigation. In some applications, high positioning accuracy is required. For example, for semi-autonomous and fully autonomous vehicles an accuracy of up to about 30 cm is required. In another example, in ride-hailing use-cases it is important to position the user on the correct side of the road, which also poses a sub-meter level accuracy. Reaching this accuracy utilizing solely GNSS technology is very challenging, especially within an urban (city) environment. This is due to the fact that the accuracy depends on the number of visible satellites, their angular spread over the visibility field (also noted as satellites geometry), the error induced to the satellites signals due to the Ionosphere and the Troposphere effects, the satellites' clock biases and orbit errors, and the surrounding environment that causes Multi-Path (MP) effects on the signals.

Other positioning and navigation techniques, such as vision based Simultaneous Localization and Mapping (SLAM), provides only localization solution (meaning, the relative position of the user with respect to its surrounding) with respect to known environment features. This approach is complex and requires significant computational efforts (i.e. image processing techniques are considered to be computationally complex with respect to ranging techniques), and does not provide the required accuracy in all scenarios (for example in scenarios with low visibility, for example due to darkness or weather). Therefore, there is a need for a solution that provides a global position (and not only a relative localization solution) with high accuracy and does not require significant computational efforts.

Therefore, it would be advantageous to provide a solution that overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for positioning based on navigation systems. The method includes receiving a list of street level stations (SLSs), conducting ranging measurements with each SLS identified within the received list, receiving a global position of the SLS identified within the received list, and computing a position of a user device based on the ranging measurements and a position of the each SLS identified within the received list.

Certain embodiments disclosed herein also include a non-transitory computer readable medium having stored thereon causing a processing circuitry to execute a process, the process includes receiving a list of street level stations (SLSs), conducting ranging measurements with each SLS identified within the received list, receiving a global position of the each SLS identified within the received list, and computing a position of a user device based on the ranging measurements and a position of the each SLS identified within the received list.

Certain embodiments disclosed herein also include a system for positioning based on navigation systems. The system includes: a processing circuitry; and a memory, the memory containing instructions that, when executed by the processing circuitry, configure the system to: receive a list of street level stations (SLSs), conduct ranging measurements with each SLS identified within the received list, receive a global position of the each SLS identified within the received list, and compute a position of a user device based on the ranging measurements and a position of the each SLS identified within the received list.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for positioning, based on a network of deployed devices incorporating both GNSS and ranging capabilities. In one embodiment, the ranging is conducted using wireless radio-frequency (RF) based technology. In another embodiment the ranging is conducted using Visible Light Communication (VLC) technology. In another embodiment the ranging is conducted based on a vision system. In another embodiment the ranging is conducted based on a Light detection and ranging (Lidar) system.

That is, a system and method for global positioning calculation is provided by a user device, using a system that includes deployed stations and a ranging server that combines various ranging techniques and global position information of the stations.

Figure 1A:
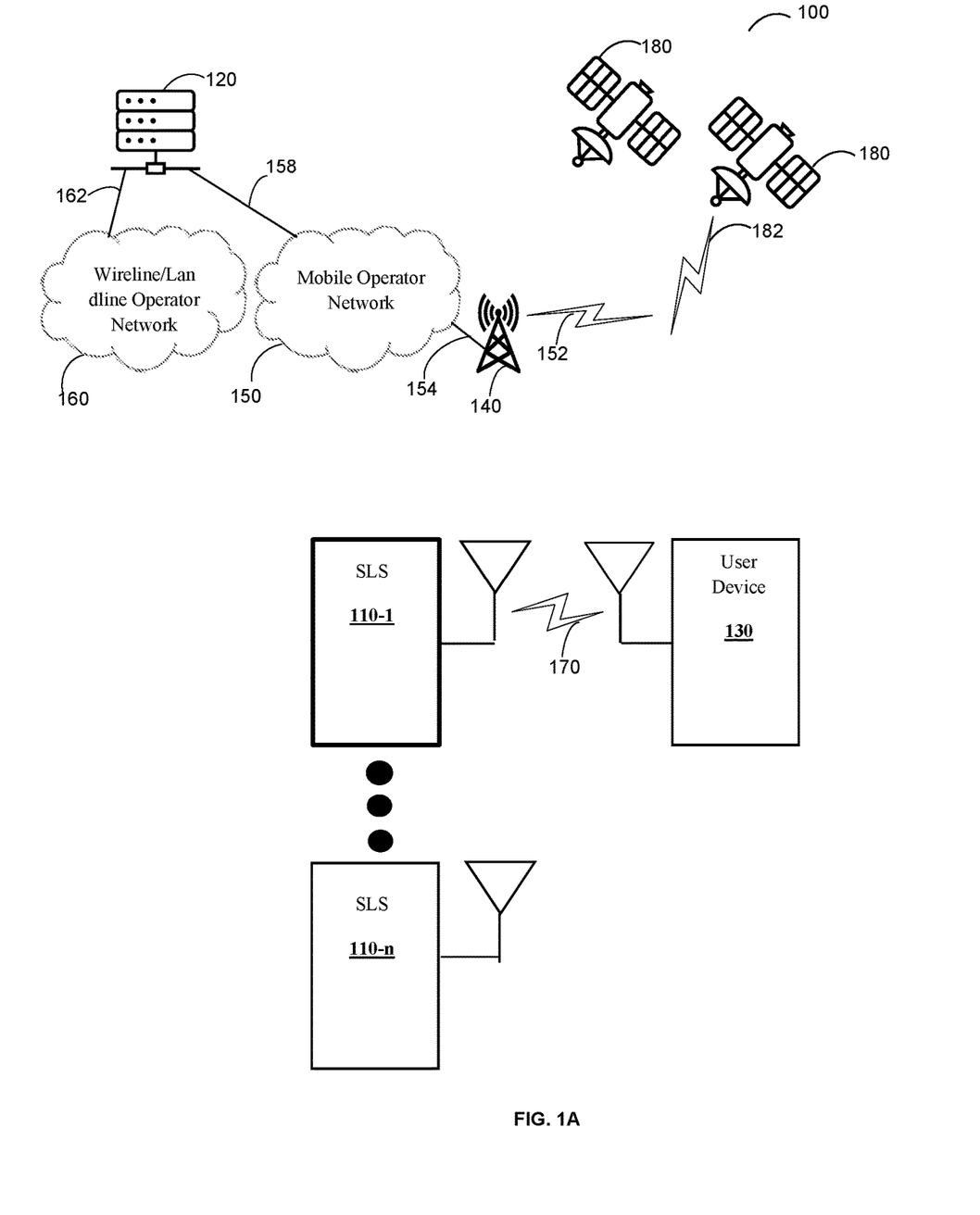
FIG. 1A is a block diagram of a ranging and GNSS positioning system utilized to describe the various disclosed embodiments.
Figure 1B:
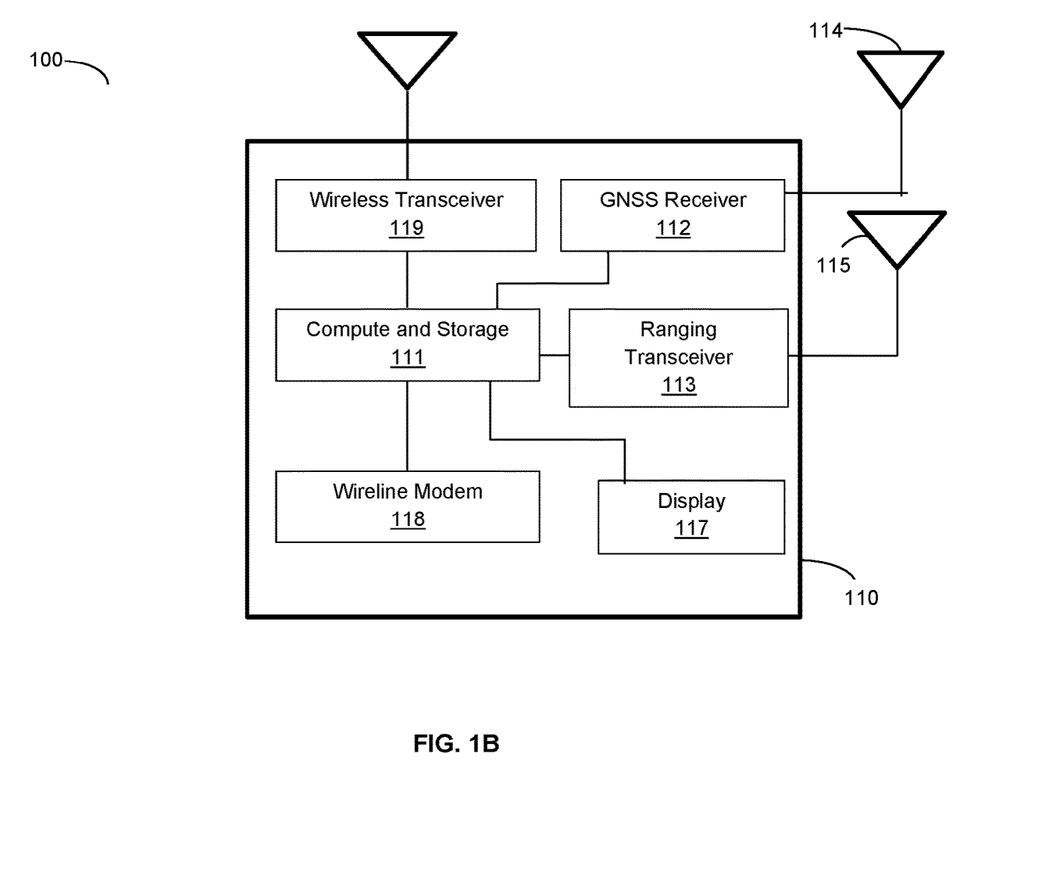
FIG. 1B is a block diagram of a ranging and GNSS positioning system utilized to describe the various disclosed embodiments.
Figure 1C:
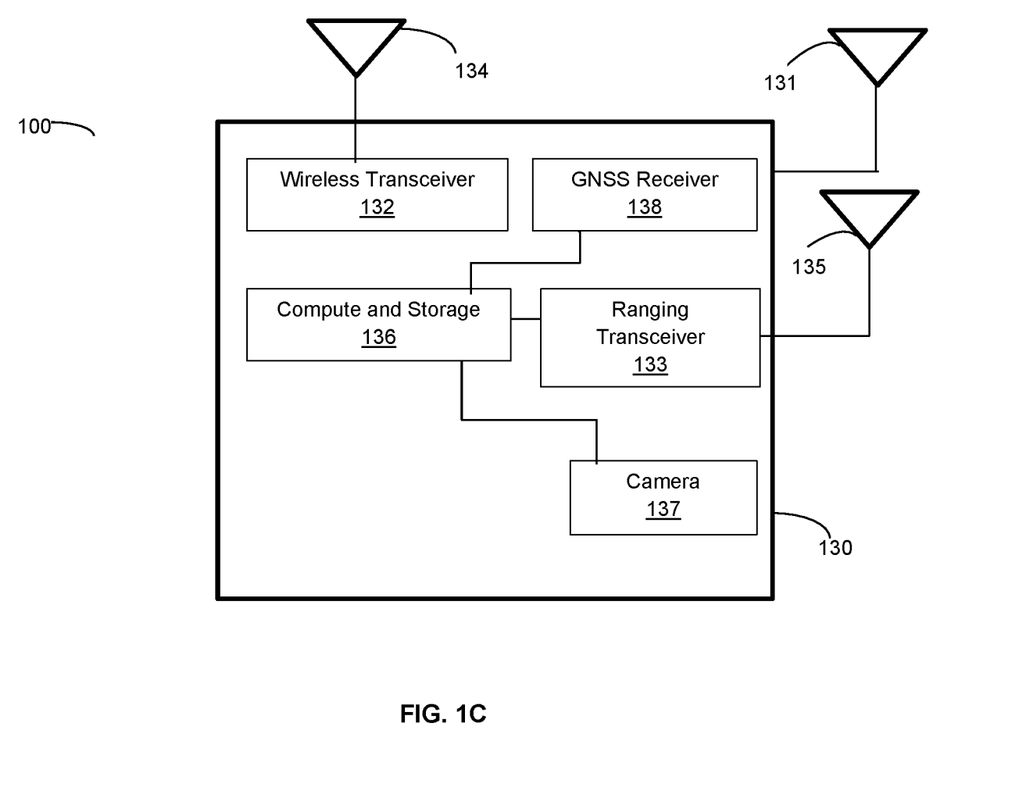
FIG. 1C is a block diagram of a ranging and GNSS positioning system utilized to describe the various disclosed embodiments.

FIGS. 1A-C are example block diagrams of a ranging and GNSS positioning system 100 utilized to describe the various disclosed embodiments. For the sake of clarity of the description, FIG. 1A shows a general GNSS positioning system 100, FIG. 1B illustrates an example block diagram of Streel Level Stations (SLS) while FIG. 1C illustrates an example block diagram of a mobile user device.

The GNSS positioning system 100 is composed of multiple Streel Level Stations (SLS), $110_{1-n}$ (hereinafter SLS 110), a ranging server 120, and an end user device 130. In an embodiment, each SLS 110 may have a GNSS receiver 112 (FIG. 1B) and a GNSS antenna 114 (FIG. 1B), respectively, to communicate with satellites 180 and receive satellite signals 182. Also, the SLS 110 is connected to the ranging server 120 using a wireless base-station or hotspot 140, through a wireless communication link 152, such as Wi-Fi or cellular 4G Long Term Evolution (LTE) or cellular 5G, and through the wireless mobile operator network 150, via a mix of wireless, backhaul, and wireline links, 154 and 158.

Alternatively, (or in parallel or as backup) the SLS 110 can be connected to the ranging server 120 via a wireline/landline operator network 160 in connection with communication links 162 and 158. To communicate with the ranging server 120, each SLS 110 uses the wireless transceiver 119 and a wireless antenna, or in the wireline alternative, a wireline modem 118. The SLS 110 also has a computing and storage device 111. In one embodiment, the SLS 110 further has wireless RF based ranging capabilities using RF ranging transceiver 113, and RF antenna 115, such as Ultra-Wide Band (UWB), WiFi ranging, cellular ranging, etc.

In another embodiment, the SLS 110 assists the user devices 130 to conduct ranging and azimuth measurements using vision-based technologies. For this purpose, the SLS 110 further includes a digital display 117. While the ranging and wireless communication elements are described separately here, in some cases a single element may support both wireless communication and ranging capabilities, including UWB, cellular LTE or Fifth Generation (5G) cellular communication.

It is important to note that the SLSs 110 are static, and while an SLS 110 can be a dedicated device deployed in a certain area, within a modern environment like a city or a highway, there are various already deployed devices that can operate as an SLS 110, for example: cellular base-stations, information kiosks, smart street-lights, digital signage, and more. These devices are equipped with the required hardware to support the capabilities needed for operation of SLS 110. Furthermore, the location (i.e., the exact global position) of each SLS 110 is known to both the SLS 110 itself and the ranging server 120. The knowledge about the location can be gathered manually, where surveying teams are dispatched to conduct precise location measurements and configure the result into the GNSS system 100. The location can alternatively be determined autonomously by the GNSS system 100, either locally at the SLS 110, or at the ranging server 120 using positioning techniques such as point-positioning, or Precise Point Positioning (PPP).

Additionally, the ranging server 120 communicates with the network of SLS 110 and with the user device 130. The ranging server 120 is a centralized computing and storage system, which can be located either in a public or private cloud, or in a hybrid cloud solution (i.e., including both public and private clouds), and potentially even become distributed once Mobile Edge Computing (MEC) infrastructure becomes available. Also, the user device 130 has wireless communication capabilities using a wireless transceiver 132 and antenna 134. The user device 130 further includes a processor and storage 136 for analyzing and storing data. Also, the user device 130 allows for GNSS capabilities to communicate with satellites 180 and receive satellite signals 182 via a GNSS receiver 138 and an antenna 131.

In one embodiment, the user device 130 additionally uses wireless RF-based components (not shown) to conduct ranging using the ranging transceiver 170, with one or more SLS 110, using a ranging transceiver 133, and antenna 135. In another embodiment, the user device 130 includes a camera 137 to measure and estimate ranging and azimuth to the SLS 110. In another embodiment, the user device 130 uses embedded VLC capabilities to conduct ranging measurements. This can be conducted using dedicated hardware such as dedicated photodiode for the reception and light-emitting-diode (LED) based transmitter, or using existing hardware such as camera, ambient light sensor, and flashlight. In another embodiment, the range measurement is conducted using Lidar based scanner.

To enable the user device 130 to conduct ranging and global positioning using the proposed GNSS system 100, the SLSs 110 (based on their ranging technologies) may periodically transmit a broadcast beacon message to detect, in the case of wireless RF ranging or VLC based ranging, or to display a dedicated image periodically. Here, the activation of the SLSs 110 for ranging transmission may be triggered by a specific request sent by the user device 130, by periodic transmission of the user device 130, or by the ranging server 120, based on the GNSS measurements collected from the SLSs 110. Also, the ranging server 120 may determine various parameters collected by SLSs 110 or the user device 130 to determine which of the ranging resources (e.g., SLSs 110) are to be activated, and the best satellites 180 to be selected out of the set of received satellites 180 in order to calculate the position of the user device 130. These parameters may include the region in which the SLSs 110 and the user device 130 are located, the time of the day, and the availability of the satellites 180 for ranging.

Based on the determined parameters, the ranging server 120 may then select specific SLSs 110 from a superset of SLSs 110 for ranging activation and compile a list of these specific SLSs 110. For example, depending on the location where the user device 130 is located, the ranging server will activate only the SLSs 110 closest to the user device 130 in a region for ranging, and depending on the time of day, when certain satellite 180 or groups of satellites 180 distributed in the sky are overhead and available to conduct ranging and communication. The ranging server 120 may then send the compiled list of SLSs 110 to a storage to be saved for later use. Alternatively, the ranging server 120 may send the list to the SLSs 110 to indicate their activation, or to a management server (e.g., a cellular operator network) (not shown) to activate the SLSs 110.

In the case where the SLS 110 displays an image, this image can be displayed for a fairly long period of time (for example 1 second). In another embodiment, the display 117 may be used for broadcasting purposes, for example, to display a banner. Alternatively, as the display 117 may be used for advertisement, where the dedicated image is displayed in a manner that a human eye does not notice its appearance. For example, 1/60 Hz or 2/60 Hz which means that in the case of 60 Hz display the image is displayed only 1 or 2 of 60 frames. This means that the digital camera 137 may still be able to detect and process the displayed image. Here, the information may be transmitted over the broadcasted message or beacon, or the image displayed may be controlled by the ranging server 120.

In operation, the user device 130 moves with a user within a region and may calculate its own position. Here, even if the user device 130 includes an embedded wireless transceiver 132 and antenna 134, and is capable of calculating its own location, in some scenarios (such as in urban environment with low satellite visibility) the user device 130 may utilize the proposed GNSS system 100 to enhance its positioning determination, and reach a solution with better accuracy and reliability.

Figure 2:
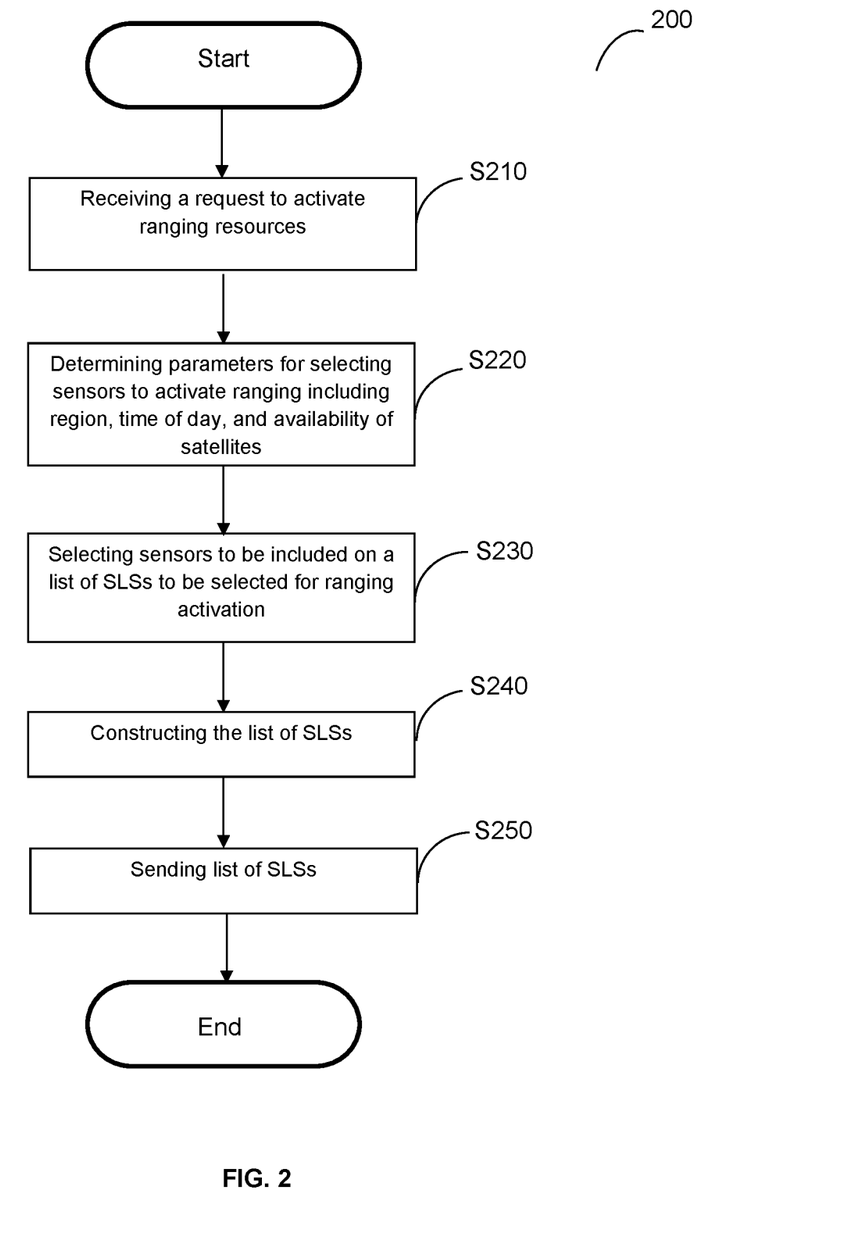
FIG. 2 is a flowchart illustrating a method of managing ranging activation, according to an embodiment.

FIG. 2 shows a method 200 of managing ranging activation, according to an embodiment. Here, the method 200 may be performed by a ranging server 120 over the network. At S210, a request to activate ranging resources is received. The request may come via selection by the user at the user device 130. Alternatively, the request may be received periodically from the user device 130. Further, the ranging server 120 may request for ranging activation by itself, based on the GNSS measurements collected by the SLSs 110. Next, at S220, various parameters are determined to determine which of the ranging resources (e.g., SLSs 110) are to be activated, and the best satellites 180 to be selected out of the set of received satellites 180 in order to calculate the position of the user device 130. These parameters may include the region in which the SLSs 110 and the user device 130 are located, the time of the day that the request is made, and the availability of the satellites 180 for ranging.

Thereafter, at S230, based on the determined parameters specific SLSs 110 are selected from a superset of SLSs 110 for ranging activation. For example, depending on the location where the user device 130 makes the ranging activation request, only the specific SLSs 110 closest to the user device 130 is activated for ranging, and depending on the time of day, when certain satellite 180 or groups of satellites 180 distributed in the sky are overhead and available to conduct ranging and communication, certain SLSs 110 may be selected. At S240, upon request, a list of SLSs 110 to be activated for ranging is constructed. Then, at S250, the list of the selected SLSs 110 is sent to the SLSs 110 to indicate their activation. Alternatively, the list may be stored or sent to a management server (e.g., a cellular operator network) to activate the SLSs 110.

With the method described above resources for conducting ranging could be conserved and efficiently allocated. In other words, only the SLSs 110 that are required for ranging with the user device 130 are activated, which saves energy, resources, and cost. Also, the users' positioning performance within the region they are located is optimized. Furthermore, active SLSs 110 may be deactivated when there are no users in the region, or when conditions changes for the satellites in view such that accurate positioning can only be enabled by GNSS, thus minimizing resource wear and energy use.

Figure 3:
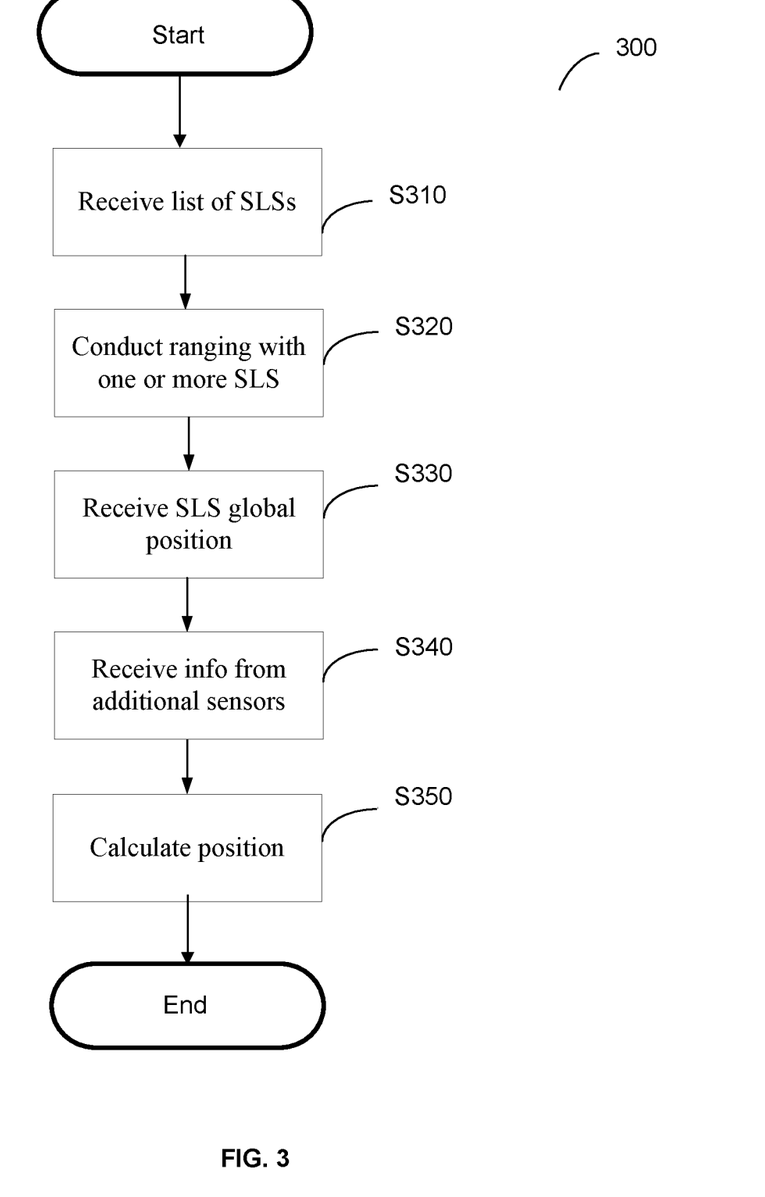
FIG. 3 is a flowchart detailing method of conducting positioning of the GNSS device, according to an embodiment.

FIG. 3 shows a method 300 of conducting positioning of the GNSS device, according to an embodiment. Here, the method may be performed periodically or due to a trigger by the user device 130. At S310, a list of SLSs is received. This list can be received in multiple methods. One example is by communication with the ranging server 120 through an Internet protocol like TCP/IP. Another example is retrieving the list of SLSs periodically (e.g., once a week), and store the list in the storage 136. When the list is needed, it may be retrieved from the compute and storage 136. In an embodiment, the received list can also be constructed or filtered based on a coarse location of the user device 130, based on the ranging capabilities of the user device 130 (that are required to match to the capabilities of the SLS), or a combination of both the coarse location and the ranging capabilities of the user device 130. In some cases, receiving the list of SLSs may not be necessary, as the SLSs 110 broadcast their availability (e.g., in the case of ranging over cellular networks).

Next, at S320, ranging is conducted with the available SLSs 110 (e.g., the SLSs in the list that are available in its close vicinity). In case of ranging based on "round-trip measurements" (e.g., in RF-based ranging such as UWB, or in VLC-based ranging which occasionally are termed by time-of-flight measurements—ToF), the measurement of the range between the two end-points (i.e., between the user device 130 and the SLS 110) is conducted. In this case, the end result (the round-trip measurement) is devised at the initiating side (whether at the user device or the SLS). Therefore, if the initiating side is at the SLS 110 then the result is transferred to the user device 130 directly (through the wireless network), or via the ranging server 120 (that may aggregate the results of several SLSs 110).

If the ranging is conducted using visual technique, where the SLS 110 presents an image on the display 117 (as described above), then the user device 130 uses the embedded camera 137 captures the image and estimates the range and azimuth towards the SLS 110 locally. For example, the image can present a certain geometric figure (such as a square of predefined size) and in accordance with its capture size, an estimate of the range can be derived. Additionally, based on the figure location on the captured image and the size of the camera sensor array the azimuth also can be estimated. The type of image (i.e., the displayed figures and their dimensions) can be provided to the SLS 110 by the computing center. Furthermore, the ranging server 120 delivers this information to the user device 130 to detect and process the images displayed by the SLS 110.

As another embodiment to conduct ranging, a wireless base-station 140 (such as cellular cell) may transmit dedicated signals for ranging (such as the ones standardized in LTE). This enables the user device 130 to measure its distance to the base-station 140. In another embodiment, a Lidar scanner (not shown) may be used by the user device 130 to scan and analyze its surrounding. In this case, a three-dimensional (3D) point-cloud is received at the user device 130. The SLS 110 or the ranging server 120 delivers to the user device 130 an image or 3D model of the SLS 110, which is used by the user device 130 to locate the SLS 110 within the point-cloud. Once the SLS (or several SLSs) 110 is located, the user device extracts the ranging and azimuth (angle) towards the SLS 110.

Additionally, instead of communicating with the ranging server 120 each time ranging is conducted, the image and/or 3D model of the SLS 110 may be stored at the user device 130 as part of a SLS "memory bank" that includes the location of all potential SLSs 110 within a certain region. This "memory bank" is delivered at when the user device 130 is turned on, periodically (e.g., once a day), or when the user device enters a new geographical region (e.g., a new city).

Once one or more ranging procedure are conducted and ranging measurements are derived, at S330, the global position of the SLSs 110 in use is received by the user device 130. This information may exist as part of the SLSs list received at S310, or received directly from the SLS 110, over the wireless communication link, or through the ranging server 120. Additionally, the SLS 110 may publish its own location, and the list of other surrounding SLSs 110 along with their locations.

Once S330 is completed, the user device may calculate an estimate of its location (the accuracy depends on various parameters). In an embodiment, at S340 additional assisting information from other sources may be received by the user device 130. For example, if the GNSS receiver 138 and antenna 131 in the user device 130 receive position-related data from an Inertial Measurement Unit (IMU) or any other sensor or external source, the GNSS receiver 138 can combine the information and calculate the position, as described below.

At S350, the position of the user device 130 is calculated by the user device 130 based on the ranging measurements and the position of the SLSs 110. This is done via triangulation techniques, for cases where only ranging is calculated, or via calculation of the range and azimuth impact on the geographic coordinate system (such as longitude and latitude). The combination with other information sources can be done by applying joint estimation techniques, or by simple or weighted averaging of all derived positions.

Once the position is known, the user device 130 may then update the ranging server 120 on its position.

The method 300 described above can also be conducted at the ranging server 120.

In this case, the ranging results and information about the used SLSs are required to be delivered to the ranging server 120 in one direction, and the calculated positioning result delivered to the user device 130 on the other direction.

Consider a received signal ranging equation as follows:

$$P_{i,k[t_0]} = \sqrt{(x_{r,t_0} - x_{i,t_0})^2 + (y_{r,t_0} - y_{i,t_0})^2 + (z_{r,t_0} - z_{i,t_0})^2} + c \cdot d\tau_{i,t_0} + \epsilon_{i,t_0} \quad (1)$$

where $P_{i,k}$—$i^{th}$ is ranging source measured range at epoch k taken at $t_0$ [m]

For the sake of brevity, the subscript indicating the 'epoch k' is omitted in the following:

$x_r, y_r, z_r$—the receiver coordinates in Earth Centered Earth Fixed system (ECEF) [m]

$x_i, y_i, z_i$—the $i^{th}$ ranging source coordinates (ECEF) [m]

$c \cdot d\tau$—range added due to receiver clock bias (when applicable—e.g. GNSS) [m]

$\epsilon_i$—ranging measurement error [m]

Assuming a coarse initial estimation is determined, the following is defined:

$$\alpha_r^0 = [x_r, y_r, z_r]_{r_0}^T \quad (2)$$

where $\alpha_r^0$ denotes the receiver coordinates at epoch time $t_0$.

Deriving a first element in Taylor series expansion with respect to initial state ($\alpha_r^0$) writes:

$$\begin{bmatrix} P_{1,t_1} \\ \vdots \\ P_{N,t_1} \end{bmatrix} - \begin{bmatrix} P_{1,t_0} \\ \vdots \\ P_{N,t_0} \end{bmatrix} \cong \quad (3)$$

$$\begin{bmatrix} \frac{x_{r,t_0} - x_{1,t_0}}{P_{1,t_0}} & \frac{y_{r,t_0} - y_{1,t_0}}{P_{1,t_0}} & \frac{z_{r,t_0} - z_{1,t_0}}{P_{1,t_0}} \\ \vdots & \vdots & \vdots \\ \frac{x_{r,t_0} - x_{N,t_0}}{P_{N,t_0}} & \frac{y_{r,t_0} - y_{N,t_0}}{P_{N,t_0}} & \frac{z_{r,t_0} - z_{N,t_0}}{P_{N,t_0}} \end{bmatrix} \begin{bmatrix} x_{r,t_1} - x_{r,t_0} \\ y_{r,t_1} - y_{r,t_0} \\ z_{r,t_1} - z_{r,t_0} \end{bmatrix}$$

We note that Eq. (3) has the form of a linear form as follows:

$$y = H \cdot \theta, \quad (4)$$

$$y = \begin{bmatrix} P_{1,t_1} \\ \vdots \\ P_{N,t_1} \end{bmatrix} - \begin{bmatrix} P_{1,t_0} \\ \vdots \\ P_{N,t_0} \end{bmatrix},$$

$$H = \begin{bmatrix} \frac{x_{r,t_0} - x_{1,t_0}}{P_{1,t_0}} & \frac{y_{r,t_0} - y_{1,t_0}}{P_{1,t_0}} & \frac{z_{r,t_0} - z_{1,t_0}}{P_{1,t_0}} \\ \vdots & \vdots & \vdots \\ \frac{x_{r,t_0} - x_{n_1,t_0}}{P_{n_1,t_0}} & \frac{y_{r,t_0} - y_{n_1,t_0}}{P_{n_1,t_0}} & \frac{z_{r,t_0} - z_{n_1,t_0}}{P_{n_1,t_0}} \end{bmatrix},$$

$$\theta = \begin{bmatrix} x_{r,t_1} - x_{r,t_0} \\ y_{r,t_1} - y_{r,t_0} \\ z_{r,t_1} - z_{r,t_0} \end{bmatrix} \stackrel{def}{=} \alpha_r^1 = \alpha_r^0$$

where y is a measurements vector [N×1], H—a linearized model matrix [N×3] and θ the unknown vector [3×1].

A weighted least squares for the above listed formulation writes:

$$\hat{\theta} = (H^T W H)^{-1} \cdot H^T \Rightarrow \widehat{\alpha_r^1} = \alpha_r^0 + (H^T W H)^{-1} \cdot H^T W y \quad (5)$$

where W is a diagonal weighting matrix. W is computed to follow an optimization criterion such as estimation minimal variance. In a naïve equal combining case W=I where I is the identity matrix.

One should note that the minimal number of received ranges must exceed the number of parameters needs to be estimated. Therefore, a minimal set of three range measurements is required. However, the larger set the better performance gained. In some cases, the gain added is not equal between measurements and there are also limitations of number of collected ranges due to power consumption, latency etc. In this case a selection policy of the optimal number of range sources along with the specific collection of sources may be generated and provisioned in the central computing center and handed over to the end user.

In another embodiment, a set of GNSS range measurements are combined with time-of-flight ranging (ToF) or other round-trip time measurements (e.g. using UWB transceivers). As GNSS receivers 110 have an inherent local clock bias noted by $c \cdot d\tau$, a mixed measurements model is written as:

$$\begin{bmatrix} P_{1,t_1} \\ \vdots \\ P_{N,t_1} \end{bmatrix} - \begin{bmatrix} P_{1,t_0} \\ \vdots \\ P_{N,t_0} \end{bmatrix} = \qquad (6)$$

$$\begin{bmatrix} \frac{x_{r,t_0} - x_{1,t_0}}{P_{1,t_0}} & \frac{y_{r,t_0} - y_{1,t_0}}{P_{1,t_0}} & \frac{z_{r,t_0} - z_{1,t_0}}{P_{1,t_0}} & c \\ \vdots & \vdots & \vdots & \\ \frac{x_{r,t_0} - x_{n_1,t_0}}{P_{n_1,t_0}} & \frac{y_{r,t_0} - y_{n_1,t_0}}{P_{n_1,t_0}} & \frac{z_{r,t_0} - z_{n_1,t_0}}{P_{n_1,t_0}} & c \\ \frac{x_{r,t_0} - x_{n_1+1,t_0}}{P_{n_1+1,t_0}} & \frac{y_{r,t_0} - y_{n_1+1,t_0}}{P_{n_1+1,t_0}} & \frac{z_{r,t_0} - z_{n_1+1,t_0}}{P_{n_1+1,t_0}} & 0 \\ \vdots & \vdots & \vdots & \vdots \\ \frac{x_{r,t_0} - x_{N,t_0}}{P_{N,t_0}} & \frac{y_{r,t_0} - y_{N,t_0}}{P_{N,t_0}} & \frac{z_{r,t_0} - z_{N,t_0}}{P_{N,t_0}} & 0 \end{bmatrix}$$

$$\begin{bmatrix} x_{r,t_1} - x_{r,t_0} \\ y_{r,t_1} - y_{r,t_0} \\ z_{r,t_1} - z_{r,t_0} \\ d\tau \end{bmatrix}$$

In Eq. (6), n_1 indicates the number of GNSS satellites used while the other ranging measurements sources provide [[ N−n[[ _1 observable (e.g. UWB, VLC, etc.). The position estimate proceeds as presented in the WLS framework above presented in Eq. (5).

The solution flow presented above in equation (2-6) is one of many potential ways to solve Eq. (1) and it is given as an example to the flow. There are iterative ways, non-linear, numerical analysis methods, and gradient descent, to name a few. The combination of two and more range sensors data in a single state vector formulation is not disclosed in the art. Here, some sensors might need calibration procedure in order to better perform in the combined set. Some of the calibration procedures that may be applied to the range measurements include: (a) interference reduction, (b) scaling, and (c) timing adjustment.

Figure 4:
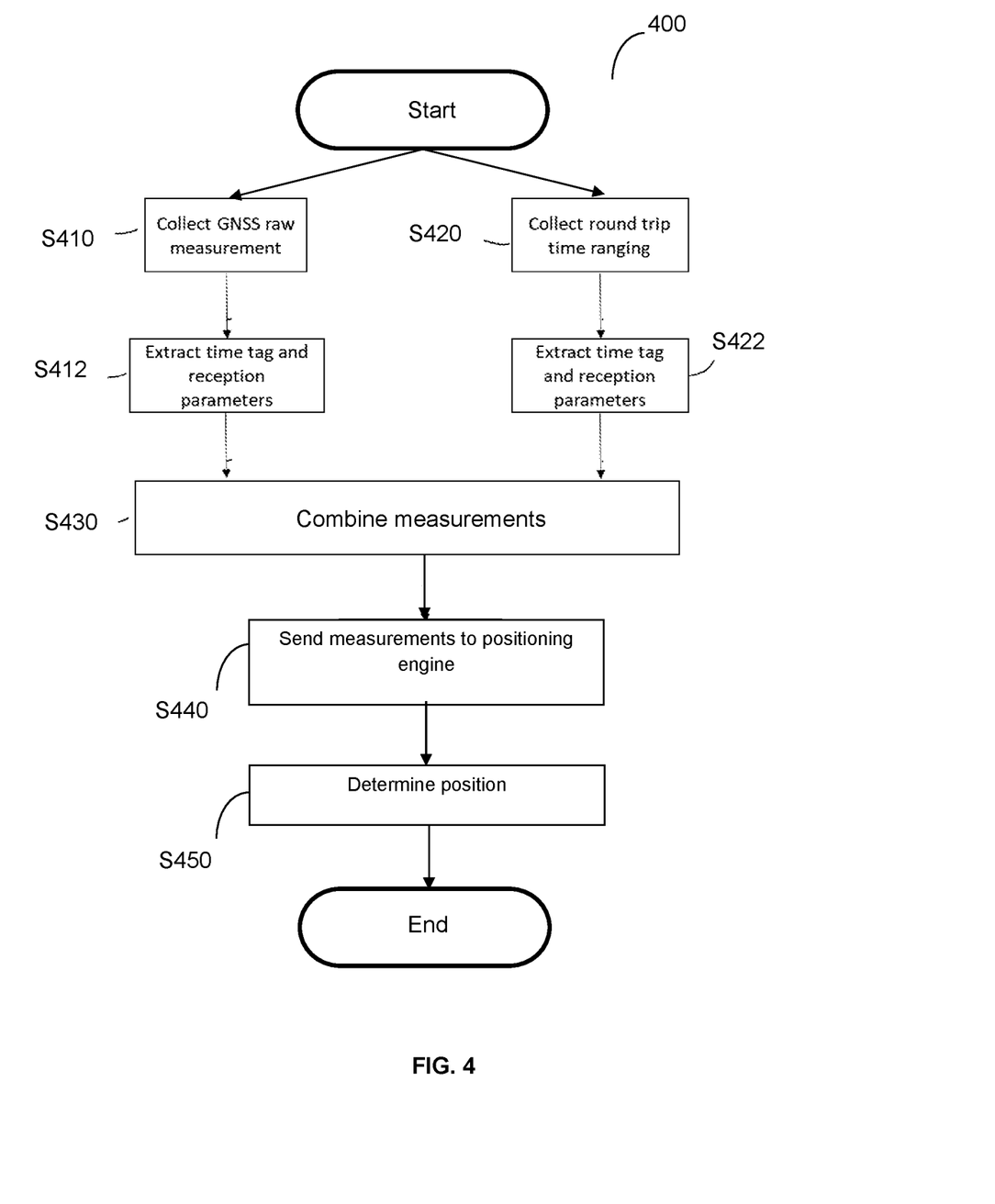
FIG. 4 is a flowchart detailing a position calculation method using GNSS positioning and ranging based a combined model, according to an embodiment.

FIG. 4 is an example flowchart 400 detailing a position calculation method 400 using GNSS positioning and ranging based a combined model, according to an embodiment. At S410, raw GNSS measurements are collected from a GNSS receiver. Also, at S420, range measurements are conducted using technologies other-than with GNSS techniques. The raw measurements from both S410 and S420 are then transferred via interfaces, and at respective S412 and S422, time epochs of each transceiver are extracted, whether they are collected using GNSS or non-GNSS techniques.

Next, at S430, the collected data is transferred via interfaces to a processing entity (not shown), the two streams of measurements are aligned by time interpolation into single time as if the entire set of measurements was received by single transceiver. For example, a GNSS clock bias element may be coupled into the model. Afterwards, at S440, the unified data structure is sent by an interface to a positioning engine, and at S450 the position is determined.

With reference back to FIG. 1, the implementation of the positioning engine and/or the model combining the measurements at S430 and S440 may occur on the user device 130 side. In another embodiment, S430 and S440 may be implemented at the ranging server 120.

Figure 5:
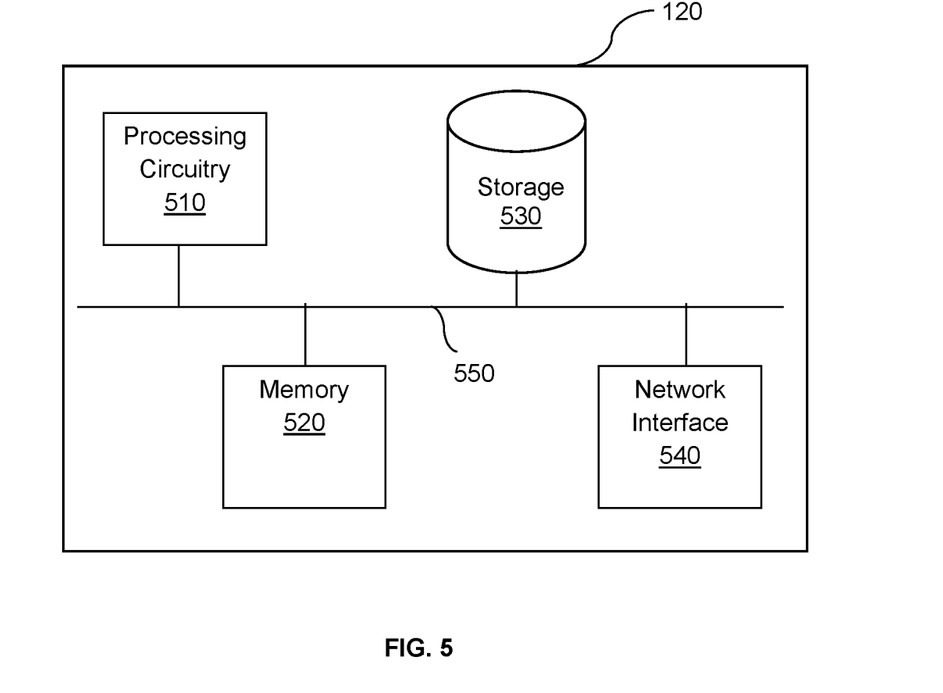
FIG. 5 is a schematic diagram of a ranging server according to an embodiment.

FIG. 5 is an example schematic diagram of a ranging server 120 according to an embodiment. The ranging server 120 includes a processing circuitry 510 coupled to a memory 520, a storage 530, and a network interface 540. In an embodiment, the components of the ranging server 120 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof. In one configuration, computer readable instructions to implement one or more embodiments disclosed herein may be stored in the storage 530.

In another embodiment, the memory 520 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the ranging server 120 to communicate with various components including the mobile operator network 150 and the wireline operator network 160 for the purpose of, for example, receiving data, sending data, and the like. Further, the network interface 540 allows the ranging server 120 to communicate with the SLSS 110 and the user device 130 for the purpose of collecting ranging and positioning data.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for determining a position of a user device based on navigation systems, comprising:
    receiving, by the user device, a list of a plurality of street level stations (SLSs) developed by a ranging server, the SLSs of the list being a selected subset that is less than all SLSs known to the ranging server, the exact global position of each of the SLSs being known a priori;
    activating for ranging each SLS identified within the received list, wherein each SLS includes a global navigation by satellite systems (GNSS) receiver;
    conducting ranging a ranging measurement by the user device with each SLS identified within the received list;
    receiving assistance information developed by:
        collecting raw GNSS measurements;
        collecting ranging data from the ranging measurements;
        extracting time tag and reception parameters of respectively collected GNSS measurements and the ranging data;
        combining the raw GNSS measurements and the ranging data to form a model; and
    computing a position of the user device based on the ranging measurements, and the known exact global position of each SLS identified within the received list and the model based on the received assistance information.

2. The method of claim 1, wherein the position of the user device is determined based on a triangulation technique.

3. The method of claim 1, wherein the position of the user device is determined based on a range calculation.

4. The method of claim 1, wherein the ranging measurements are is conducted periodically.

5. The method of claim 1, wherein each ranging measurement further includes measuring a distance of the user device to a base station.

6. The method of claim 1, wherein each ranging measurement is conducted using Lidar.

7. The method of claim 1, further comprising:
    receiving, by the ranging server, a request to activate a plurality of ranging resources;
    determining, by the ranging server, parameters for selecting the SLSs for ranging activation from the plurality of ranging resources;
    selecting, by the ranging server, the SLSs based on the determined parameters;
    constructing, by the ranging server, the list of the selected SLSs; and
    sending, by the ranging server, the list of the selected SLSs for ranging activation.

8. The method of claim 1, wherein the SLSs of the list are selected based on a location where the user device is located.

9. The method of claim 8, wherein the SLSs of the list are those within a prescribed distance to the user device within a region for ranging.

10. The method of claim 1, wherein the SLSs of the list are selected based on a time of day at which selecting of the SLSs of the list selecting is performed.

11. The method of claim 1, wherein the SLSs of the list are selected based on satellite visibility to the user device.

12. The method of claim 1, wherein the SLSs of the list are selected based on when at least one satellite is overhead of at least one of the SLSs and the at least one satellite is available to conduct ranging.

13. A method for positioning based on navigation systems comprising:
    receiving a list of a plurality of street level stations (SLSs) developed by a ranging server, the SLSs of the list being a selected subset that is less than all SLSs known to the ranging server and wherein each SLS includes a global navigation by satellite systems (GNSS) receiver, and wherein the method further comprises;
    activating for ranging each SLS identified within the received list;
    conducting ranging measurements with each SLS identified within the received list;
    receiving a global position of the each SLS identified within the received list;
    receiving assistance information, wherein the assistance information is developed by:
        collecting raw GNSS measurement;
        collecting round-trip time ranging data;

extracting time tag and reception parameters of respectively collected GNSS measurement and the round-trip time ranging data; and combining the GNSS raw measurement and the round-trip time ranging data to form a model; and computing a position of a user device based on the ranging measurements, the GNSS raw measurements, the model, and the global position of each SLS identified within the received list.

14. A system for determining a position of a user device based on navigation systems, comprising:

a processing circuitry; and a memory, the memory containing instructions that, when executed by the processing circuitry, configure the system to:

receive, by the user device, a list of a plurality of street level stations (SLSs) developed by a ranging server, the SLSs of the list being a selected subset that is less than all SLSs known to the ranging server, the exact global position of each of the SLSs being know a priori;

activate for ranging each SLS identified within the received list, wherein each SLS includes a global navigation by satellite systems (GNSS) receiver;

conduct ranging a ranging measurement by the user device with each SLS identified within the received list;

receive assistance information developed by:
collecting raw GNSS measurements;
collecting ranging data from the ranging measurements;
extracting time tag and reception parameters of respectively collected GNSS measurements and the ranging data;
combining the raw GNSS measurements and the ranging data to form a model; and compute a position of the user device based on the ranging measurements and the known exact global position of each SLS identified within the received list and the model based on the received assistance information.

15. The system of claim 14, wherein the position of the user device is determined based on a triangulation technique.

16. The system of claim 14, wherein the position of the user device is determined based on a range calculation.

17. The system of claim 14, wherein the ranging measurements are conducted periodically.

18. The system of claim 14, wherein each ranging measurement further includes measuring a distance of the user device to a base station.

19. The system of claim 14, wherein each ranging measurement is conducted using Lidar.

20. The system of claim 14, wherein the system is further configured to:

receive, by the ranging server, a request to activate a plurality of ranging resources;

determine, by the ranging server, parameters for selecting the SLSs for ranging activation from the plurality of ranging resources;

select, by the ranging server, the SLSs based on the determined parameters;

construct, by the ranging server, a list of the selected SLSs; and send, by the ranging server, the list of the selected SLSs for ranging activation.

21. The system of claim 14, wherein the SLSs of the list are selected based on a location where the user device is located.

22. The system of claim 21, wherein the SLSs of the list are those within a prescribed distance to the user device within a region for ranging.

23. The system of claim 14, wherein the SLSs of the list are selected based on a time of day at which selecting of the SLSs of the list selecting is performed.

24. The system of claim 14, wherein the SLSs of the list are selected based on satellite visibility to the user device.

* * * * *